United States Patent Office 3,287,361
Patented Nov. 22, 1966

3,287,361
DERIVATIVES OF BENZOTHIADIAZINE-1,1-
DIOXIDES
Jerry E. Robertson, Milwaukee, Wis., assignor to Colgate-Palmolive Company, a corporation of Delaware
No Drawing. Filed Apr. 27, 1961, Ser. No. 105,908
2 Claims. (Cl. 260—243)

This invention relates to chemical compounds and porcesses of producing the same. More particularly, this invention is concerned with novel derivatives of benzothiadiazine, their preparation and uses.

This application is a continuation-in-part of copending application Serial No. 35,913 filed June 14, 1960 and now abondoned, and of copending application Serial No. 74,229 filed December 7, 1960.

According to the present invention there are provided novel 2-substituted benzothiadiazines of the formulas

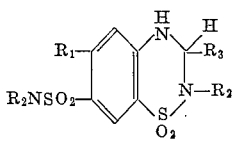

and

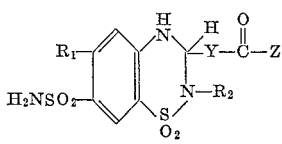

wherein $R_1$ is hydrogen, a lower alkyl such as methyl, a lower alkoxy such as methoxy, a halogen and particularly bromine or chlorine, a halo-lower alkyl such as trifluoromethyl, and trifluoroacetylamino, $R_2$ is a lower alkenyl such as allyl, a lower alkynyl such as propargyl, a di-lower alkyl amino-lower alkyl group such as dimethylaminoethyl, a phenyl-lower alkyl in which the lower alkyl is straight or branched and the phenyl is unsubstituted or substituted such as with one or more halo, nitro, lower alkoxy, lower alkyl or hydroxy groups such as the benzyl, phenethyl, phenylisopropyl, phenylpropyl, p-methylbenzyl and p-chlorophenethyl groups or a phenyl-lower alkenyl group such as cinnamyl, $R_3$ is hydrogen, a lower alkyl such as methyl, ethyl, propyl, isopropyl and butyl, a halo-lower alkyl such as chloromethyl, dichloromethyl, trifluoromethyl and beta-bromoethyl, or an aralkyl group and particularly a phenyl-lower alkyl in which the lower alkyl is straight or branched and the phenyl is unsubstituted or substituted such as with one or more halo, nitro, lower alkoxy, lower alkyl or hydroxy groups such as benzyl, phenethyl, para-methoxyphenylethyl and diphenylmethyl, Y is a chemical bond or a straight or branched lower alkylene as of 1 to 8 carbon atoms such as methylene, ethylene and propylene and Z is a lower alkyl such as methyl, ethyl, isopropyl, propyl, buytl, isobutyl, tertiary butyl and amyl, an aryl group such as phenyl and substituted phenyl groups like halophenyl, lower alkoxy-phenyl and lower alkyl-phenyl, aralkyl groups such as phenyl-lower alkyl groups like benzyl and phenylethyl, or a halo-lower alkyl such as chloromethyl, dichloromethyl and bromophenyl.

The compounds of this invention can be produced by reacting an appropriate 2,4-disulfamylaniline with an aldehyde. In forming the compounds of Formulas I and II above the same process is used although with different reactants. These processes will be illustrated separately to maintain simplicity.

The process of forming the compounds of Formula I can be represented as follows:

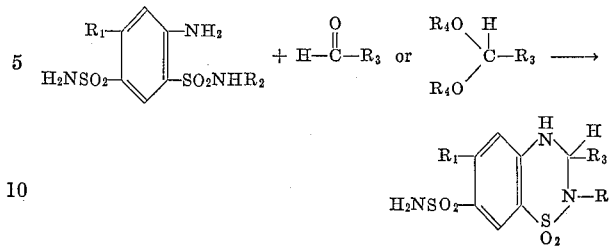

wherein $R_1$, $R_2$, $R_3$ and $R_4$ have the assigned significance.

The compounds of Formula II can be produced by reacting an appropriate 2,4-disulfamylaniline with a ketoaldehyde or ketoacetal. The reaction can be represented as follows:

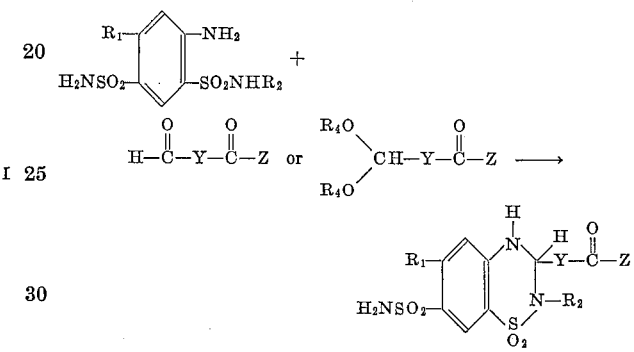

wherein $R_1$, $R_2$, Y and Z have the significance previously assigned and $R_4$ is a lower alkyl such as methyl or ethyl.

Some of the 2-substituted-2,4-disulfamylaniline derivatives which can be used in this reaction are:

2-allylsulfamyl-4-sulfamyl-5-chloro-aniline,
2-allylsulfamyl-4-sulfamyl-5-trifluoromethyl-analine,
2-allylsulfamyl-4-sulfamyl-5-bromo-aniline,
2-propargylsulfamyl-4-sulfamyl-5-chloro-aniline,
2-benzylsulfamyl-4-sulfamyl-5-trifluoroacetylamino-aniline,
2-(beta-dimethylaminoethyl)-sulfamyl-4-sulfamyl-5-chloro-aniline,
2-benzylsulfamyl-4-sulfamyl-5-chloro-aniline,
2-(beta-phenethyl)-sulfamyl-4-sulfamyl-5-trifluoromethyl-aniline,
2-phenylisopropylsulfamyl-4-sulfamyl-5-chloro-aniline,
2-propargylsulfamyl-4-sulfamyl-5-trifluoromethyl-aniline,
2-(para-methoxybenzyl)sulfamyl-4-sulfamyl-5-trifluoromethyl-aniline,
2-benzylsulfamyl-4-sulfamyl-5-trifluoromethyl-aniline,
2-(beta-phenethyl)-sulfamyl-4-sulfamyl-5-chloro-aniline,
2-butenylsulfamyl-4-sulfamyl-5-bromo-aniline and
2-pentenylsulfamyl-4-sulfamyl-5-chloro-aniline.

Some of the aldehydes, or equivalent acetals, which can be used in the process are formaldehyde, acetaldehyde, propionaldehyde, n-valeraldehyde, caproaldehyde, benzaldehyde, phenylacetaldehyde, beta-phenylpropionaldehyde, beta-methoxypropionaldehyde, diphenylacetaldehyde, p-chlorophenylacetaldehyde diethyl acetal, bromoacetaldehyde diethyl acetal, dichloroacetaldehyde and trifluoroacetaldehyde.

In addition, ketoaldehydes and their equivalent ketoacetals can also be employed in the process. Some of the ketoaldehydes which can be used, either as the free aldehyde or as an acetal, are 3-ketobutyraldehyde-1-dimethylacetal, pyruvaldehyde, dichloropyruvaldehyde, levulinaldehyde, trifluoromethylpyruvaldehyde, 4-phenyl-3-ketobutyraldehyde dimethylacetal, 3-ketohexanal-1,4-keto-8- chloro-octanal-1 and 2-keto-5-phenyl-pentanal-1,4-(para-nitrophenyl)-3-ketobutyraldehyde, 4-(para-trifluoromethylphenyl)-3-ketobutyraldehyde and 4-(meta-chlorophenyl)-3-ketobutyraldehyde, 3-ketopentanal, 4-ketohexanal, and 3-keto-3-phenylpropanal.

The compounds of this invention can be produced by reacting the appropriate 2,4-disulfamylaniline with the appropriate aldehyde in the presence of a suitable inert organic reaction medium such as dimethyl formamide and at a moderately elevated temperature such as from about 70 to 150° C. Water can be present in the reaction mixture. A catalytic amount of an acid such as aqueous hydrochloric acid or p-toluenesulfonic acid is included in the reaction mixture to promote the reaction. The reaction is generally completed in about one-half to three hours. After the reaction is terminated, the solvent is removed as by evaporation under reduced pressure, the residue taken up in alcohol and crystallized from aqueous alcohol.

Some of the 2-substituted benzothiadiazines which are produced as described are:

2-allyl-3,4-dihydro-6-trifluoromethyl-7-sulfamyl-1,2,4-benzothiadiazine-1,1-dioxide,
2-propargyl-3,4-dihydro-6-chloro-7-sulfamyl-1,2,4-benzothiadiazine-1,1-dioxide,
2-benzyl-3,4-dihydro-6-bromo-7-sulfamyl-1,2,4-benzothiadiazine-1,1-dioxide,
2-phenethyl-3,4-dihydro-6-trifluoromethyl-7-sulfamyl-1,2,4-benzothiadiazine-1,1-dioxide,
2-allyl-3-methyl-3,4-dihydro-6-chloro-7-sulfamyl-1,2,4-benzothiadiazine-1,1-dioxide,
2-propargyl-3-ethyl-3,4-dihydro-6-bromo-7-sulfamyl-1,2,4-benzothiadiazine-1,1-dioxide,
2-benzyl-3-phenethyl-3,4-dihydro-6-bromo-7-sulfamyl-1,2,4-benzothiadiazine-1,1-dioxide,
2-phenethyl-3-chloromethyl-3,4-dihydro-6-bromo-7-sulfamyl-1,2,4-benzothiadiazine-1,1-dioxide,
2-benzyl-3-dichloromethyl-3,4-dihydro-6-bromo-7-sulfamyl-1,2,4-benzothiadiazine-1,1-dioxide and ketoalkylbenzothiadiazines such as:

2-allyl-3,4-dihydro-3-(beta-keto-n-propyl)-6-trifluoromethyl-7-sulfamyl-1,2,4-benzothiadiazine-1,1-dioxide,
2-allyl-3-acetyl-3,4-dihydro-7-sulfamyl-6-trifluoromethyl-1,2,4-benzothiadiazine-1,1-dioxide,
2-benzyl-6-chloro-3,4-dihydro-3-(beta-keto-n-propyl)-7-sulfamyl-1,2,4-benzothiadiazine-1,1-dioxide,
2-phenethyl-3,4-dihydro-6-bromo-3-(beta-keto-n-propyl)-7-sulfamyl-1,2,4-benzothiadiazine-1,1-dioxide,
2-allyl-3-acetyl-6-chloro-3,4-dihydro-7-sulfamyl-1,2,4-benzothiadiazine-1,1-dioxide,
2-benzyl-3,4-dihydro-6-chloro-3-dichloroacetyl-7-sulfamyl-1,2,4-benzothiadiazine-1,1-dioxide,
2-allyl-3,4-dihydro-6-trifluoroacetylamino-3-(gamma-phenyl-beta-keto-propyl)-7-sulfamyl-1,2,4-benzothiadiazine-1,1-dioxide,
2-phenylisopropyl-3,4-dihydro-6-bromo-3-(gamma-trifluoromethylphenyl-beta-keto-propyl)-7-sulfamyl-1,2,4-benzothiadiazine-1,1-dioxide,
2-propargyl-3,4-dihydro-6-chloro-3-(gamma-keto-butyl)-7-sulfamyl-1,2,4-benzothiadiazine-1,1-dioxide,
2-allyl-3,4-dihydro-6-bromo-3-(beta-keto-n-propyl)-7-sulfamyl-1,2,4-benzothiadiazine-1,1-dioxide,
2-benzyl-3,4-dihydro-6-trifluoromethyl-3-(beta-keto-propyl)-7-sulfamyl-1,2,4-benzothiadiazine-1,1-dioxide,
2-propargyl-3,4-dihydro-6-bromo-3-(beta-keto-propyl)-7-sulfamyl-1,2,4-benzothiadiazine-1,1-dioxide,
2-benzyl-3-acetyl-3,4-dihydro-6-bromo-7-sulfamyl-1,2,4-benzothiadiazine-1,1-dioxide,
2-(beta-phenethyl)-3,4-dihydro-6-trifluoromethyl-3-(beta-keto-beta-phenethyl)-7-sulfamyl-1,2,4-benzothiadiazine-1,1-dioxide,
2-allyl-3,4-dihydro-6-bromo-3-propionyl-7-sulfamyl-1,2,4-benzothiadiazine-1,1-dioxide,
2-cinnamyl-3,4-dihydro-3-(beta-keto-n-propyl)-6-trifluoromethyl-7-sulfamyl-1,2,4-benzothiadiazine-1,1-dioxide,
2-benzyl-3-acetyl-3,4-dihydro-7-sulfamyl-6-trifluoromethyl-1,2,4-benzothiadiazine-1,1-dioxide,
2-allyl-6-chloro-3,4-dihydro-3-(beta-keto-n-propyl)-7-sulfamyl-1,2,4-benzothiadiazine-1,1-dioxide,
2-phenethyl-3,4-dihydro-6-methyl-(beta-keto-n-propyl)-7-sulfamyl-1,2,4-benzothiadiazine-1,1-dioxide,
2-benzyl-3-acetyl-6-chloro-3,4-dihydro-7-sulfamyl-1,2,4-benzothiadiazine-1,1-dioxide,
2-allyl-3,4-dihydro-6-chloro-3-dichloroacetyl-7-sulfamyl-1,2,4-benzothiadiazine-1,1-dioxide,
2-allyl-3,4-dihydro-6-trifluoroacetylamino-3-(gamma-phenyl-beta-keto-propyl)-7-sulfamyl-1,2,4-benzothiadiazine-1,1-dioxide,
2-(gamma-phenylpropyl)-3,4-dihydro-6-chloro-3-(gamma-trifluoromethylphenyl-beta-keto-propyl)-7-sulfamyl-1,2,4-benzothiadiazine-1,1-dioxide,
2-(beta-dimethylaminoethyl)-3,4-dihydro-6-chloro-3-(gamma-keto-butyl)-7-sulfamyl-1,2,4-benzothiadiazine-1,1-dioxide,
2-benzyl-3,4-dihydro-6-trifluoromethyl-3-(beta-keto-beta-phenethyl)-7-sulfamyl-1,2,4-benzothiadiazine-1,1-dioxide,
2-benzyl-3,4-dihydro-6-bromo-3-propionyl-7-sulfamyl-1,2,4-benzothiadiazine-1,1-dioxide, and
2-(beta-phenethyl)-3,4-dihydro-6-chloro-3-(gamma-keto-butyl)-7-sulfamyl-1,2,4-benzothiadiazine-1,1-dioxide.

These and other compounds of this invention are highly effective diuretic agents, which promote the excretion of excess fluid and sodium chloride from animals and are, therefore, useful in the treatment of congestive heart failure. They are also hypotensive agents.

Compounds of the formula

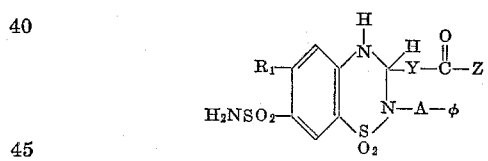

wherein $R_1$, Y and Z have the assigned significance, A is a lower alkylene, straight or branched, such as methylene, ethylene, propylene, isopropylene and n-butylene and $\phi$ is phenyl or a substituted phenyl group, are particularly useful diuretics.

The compounds of this invention can be administered in pharmaceutical unit-dosage forms formed by combining one or more of the active compounds with a pharmaceutical carrier and then manufacturing capsules, tablets and powders therefrom. Such unit-dosage forms can contain about 5 to 500 mgm., and advisably 5 to 100 mgm., of one or more of the active compounds of this invention.

The reactants of the formula

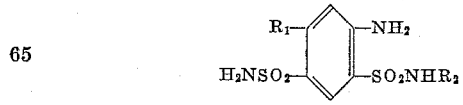

used in the described process in which $R_1$ and $R_2$ have the assigned meaning can be produced by reacting a 3-keto - 7 - sulfamly - 2H - 1,2,4-benzothiadiazine - 1,1-dioxide with an alkenylating or aralkylating agent to produce a 2-substituted -3-keto-7-sulfamly-1,2,4-benzothiadiazine-1,1-dioxide and treating said compound with a base to open the ring and form a 2-substituted-sulfamyl- 4-sulfamyl-aniline. This process can be represented as follows:

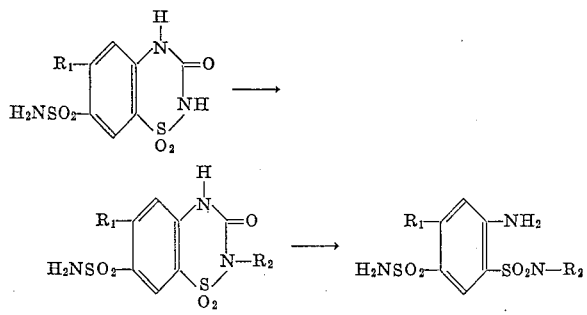

wherein $R_1$ and $R_2$ have the assigned meanings.

The 3-keto-7-sulfamyl-2H-1,2,4-benzothiadiazine-1,1-dioxides used in this process can be produced as in J. Am. Chem. Soc. 82, 2042 (1960) and J. M. Chem. Soc. 82, 1132 (1960).

The described process can be effected by procedures in the literature as in J. Am. Chem. Soc. 82, 1132 (1960). Some of the compounds that can be produced in the first step of this process are 2-allyl-3-keto-6-trifluoromethyl-7-sulfamyl-1,2,4-benzothiadiazine-1,1-dioxide, 2-benzyl-3-keto - 6 - trifluoro - methyl - 7 - sulfamyl - 1,2,4 - benzothiadiazine - 1,1 - dioxide, 2 - phenethyl - 3 - keto - 6-chloro-7-sulfamyl-1,2,4-benzothiadiazine-1,1-dioxide, 2-propargyl - 3 - keto - 6- chloro - 7 - sulfamyl - 1,2,4 - benzothiadiazine-1,1-dioxide, 2-cinnamyl-3-keto-6-trifluoromethyl-7-sulfamly-1,2,4-benzothiadiazine-1,1-dioxide, 2-benzyl - 3 - keto - 6 - chloro - 7 - sulfamyl - 1,2,4 - benzothiadiazine - 1,1 - dioxide, 2 - (beta-phenethyl) - 3 - keto-6-bromo-7-sulfamyl-1,2,4-benzothiadiazine and 2-allyl-3-keto-6-chloro-7-sulfamyl-1,2,4-benzothiadiazine.

Opening of the ring can be achieved in an aqueous inorganic basic medium at a moderately elevated temperature employing conventional techniques. Some of the compounds produced in this way are:

2-allylsulfamyl-4-sulfamyl-5-trifluoromethylaniline,
2-cinnamylsulfamyl-4-sulfamyl-5-trifluoromethylaniline,
2-dimethylaminoethylsulfamyl-4-sulfamyl-5-chloroaniline,
2-propargylsulfamyl-4-sulfamyl-5-chloroaniline,
2-allylsulfamyl-4-sulfamyl-5-chloroaniline,
2-benzylsulfamyl-4-sulfamyl-5-trifluoromethylaniline,
2-(beta-phenethyl)-4-sulfamyl-5-chloroaniline and
2-(beta-phenethyl)-4-sulfamyl-5-trifluoromethylaniline.

The following examples are presented to illustrate the preparation of representative compounds within the scope of the invention.

*Example 1.—2-benzyl-3,4-dihydro-3-keto-7-sulfamyl-6-trifluoromethyl-1,2,4-benzothiadiazine-1,1-dioxide*

To a solution of 20.7 g. (0.060 mole) of 3,4-dihydro-3 - keto - 7 - sulfamyl - 6 - trifluoromethyl - 1,2,4 - benzothiadiazine-1,1-dioxide in 40 ml. of dimethylformamide was added 2.6 g. of 53% sodium hydride-oil (0.060 mole). An exothermic reaction ensued. After stirring at room temperature for one hour, 10.4 g. (0.061 mole) of benzyl bromide was added dropwise. After stirring at room temperature for an additional hour, the reaction mixture was held at 60° C. for one hour. Cooling and dilution with 1.2 liters of water induced an oil to separate which crystallized on standing. This solid was collected, washed with heptane, and dried to afford 10 g. of crude product, M.P. 210°–213° C. The crude product was triturated with chloroform and further purified by dissolution in dilute sodium hydroxide and reprecipitated with dilute acetic acid to afford 7.8 g. (30%) of pure product, M.P. 229°–231° C.

*Analysis.*—Calcd. for $C_{15}H_{12}N_3O_5S_2F_3$: N, 9.65; S, 14.73. Found: N, 9.68; S, 14.49.

*Example 2.—2-benzylsulfamyl-4-sulfamyl-5-trifluoromethyl-aniline*

A solution of 7.8 g. (0.018 mole) of 2-benzyl-3,4-dihydro - 3 - keto - 7 - sulfamyl - 6 - trifluoromethyl-1,2,4-benzothiadiazine-1,1-dioxide in 70 ml. of 10% sodium hydroxide was refluxed and stirred for 6 hours. Cooling, adjustment of the pH to 2–3 with concentrated hydrochloric acid and further cooling afforded a solid which was collected, washed with water and dried. Recrystallization of this crude product from ethanol (charcoal) gave 4.6 g. (63.1%) of pure product, M.P. 190°–194° C.

*Analysis.*—Calcd. for $C_{14}H_{14}N_3O_4S_2F_3$: N, 10.26; S, 15.66. Found: N, 10.19; S, 15.46.

*Example 3.—2-benzyl-3,4-dihydro-3-(beta-oxopropyl)-7-sulfamyl - 6-trifluoromethyl - 1,2,4 - benzothiadiazine-1,1-dioxide*

2-benzylsulfamyl-4-sulfamyl - 5 - trifluoromethylaniline (4.0 g., 0.0098 mole), 5 drops of concentrated hydrochloric acid and 1.45 g. (0.0110 mole) of 3-oxobutyraldehyde dimethylacetal were dissolved in 25 ml. of dimethylformamide and the solution held at 90°–100° C. for 70 minutes. The solvent was removed in vacuo and the residue dissolved in 100 ml. of ethanol. Filtration, dilution with 300 ml. of water, and cooling gave a gum from which was decanted the mother liquor. The residue was crystallized from dilute ethanol to provide 2.6 g. (54%) of product, M.P. 148°–152° C.

*Analysis.*—Calcd. for $C_{18}H_{19}F_3N_3O_5S_2$: N, 8.78; S, 13.38. Found: N, 8.63; S, 13.29.

*Example 4.—2-allyl-6-chloro-3,4-dihydro-3-keto-7-sulfamyl-1,2,4-benzothiadiazine-1,1-dioxide*

6-chloro - 3,4 - dihydro-3-keto-7-sulfamyl-1,2,4-benzothiadiazine-1,1-dioxide (14.8 g., 0.0475 mole) was dissolved in 50 ml. of dimethylformamide and 2.1 g. of 56.3% NaH in oil (0.0475 mole) was added with stirring at room temperature. After 0.5 hour of additional stirring, 6.05 g. (0.0475 mole) of allyl bromide was added and the mixture held at 60°–70° C. for 3 hours. After cooling, the reaction mixture was poured into 1.5 liters of water. Cooling overnight gave a solid which was collected, washed with water, dissolved in dilute NaOH, and reprecipitated with dilute acetic acid. The resultant solid was collected, washed with water and dried to afford 13.4 g. (81%) of product, M.P. 285°–289° C.

*Analysis.*—Calcd. for $C_{10}H_{10}ClN_3O_5S_2$: S, 18.21; Cl, 10.07. Found: S, 17.97; Cl, 10.25.

*Example 5.—2-allylsulfamyl-5-chloro-4-sulfamylaniline*

2-allyl - 6 - chloro-3,4-dihydro-3-keto-7-sulfamyl-1,2,4-benzothiadiazine-1,1-dioxide (26.0 g., 0.075 mole) dissolved in 300 ml. of 15% NaOH was held at 90°–100° C. for 7 hours. Cooling and addition of excess hydrochloric acid gave a solid which was collected, washed with water and recrystallized from dilute ethanol to afford 11.1 g. (45%) of the product as a monohydrate, M.P. 76°–78° C.

*Analysis.*—Calcd. for $C_9H_{14}ClN_3O_5S_2$: S, 18.70. Found: S, 18.71.

Extended drying at 100° C. gave the product as an amorphous solid.

*Analysis.*—Calcd. for $C_9H_{12}ClN_3O_4S_2$: S, 19.72; Cl, 10.89. Found: S, 19.48; Cl, 10.98.

*Example 6.—2-allyl-6-chloro - 3,4 - dihydro-3-(beta-oxopropyl) - 7 - sulfamyl - 1,2,4 - benzothiadiazine - 1,1-dioxide*

2-allylsulfamyl - 5-chloro - 4 - sulfamylaniline monohydrate (4.0 g., 0.0116 mole), 1.7 g. (0.013 mole) of 3-oxobutyraldehyde dimethylacetal, and 5 drops of concentrated hydrochloric acid were dissolved in 25 ml. of dimethylformamide and the solution was held at 90°–100°

C. for one hour. The solvent was removed in vacuo and the residue crystallized and recrystallized several times from dilute ethanol to afford 0.6 g. (13%) of product, M.P. 210°–211° C.

*Analysis.*—Calcd. for $C_{13}H_{16}ClN_3O_5S_2$: C, 39.55; H, 4.10; N, 10.67. Found: C, 39.60; H, 4.43; N, 10.71.

*Example 7.—2-allyl-6-chloro-3,4-dihydro-7-sulfamyl-1,2,4-benzothiadiazine-1,1-dioxide*

2-allylsulfamyl - 5 - chloro-4-sulfamylaniline monohydrate (5.0 g., 0.0145 mole), 2 drops of concentrated hydrochloric acid and 1.35 g. of 35% aqueous formaldehyde (0.016 mole) were dissolved in 25 ml. of dimethylformamide and the solution held at 90–100° C. for 6 hours. The solvent was removed in vacuo and the residue crystallized and recrystallized by dissolution in ethanol and reprecipitation with water to afford 1.9 g. (38%) of product, M.P. 145–155° C.

*Analysis.*—Calcd. for $C_{10}H_{12}ClN_3O_4S_2$: Cl, 10.50; N, 12.43. Found: Cl, 10.39; N, 12.31.

*Example 8.—2-allyl-3-benzyl-6-chloro - 3,4-dihydro-7-sulfamyl-1,2,4-benzothiadizine-1,1-dioxide*

2-allylsulfamyl - 5-chloro - 4 - sulfamylaniline monohydrate (5.0 g., 0.0145 mole), 0.5 ml. concentrated hydrochloric acid and 2.42 g. (0.0145 mole) phenylacetaldehyde dimethylacetal were dissolved in 25 ml. of dimethylformamide and the solution held at 90–100° C. for 4.5 hours. The solvent was removed in vacuo and the residue dissolved in 100 ml. of ethanol. Filtration, dilution was 150 ml. water, and cooling gave a gum from which the mother liquor was decanted. Extended drying in vacuo at 60–70° C. gave a foam which was ground under ether then crystallized by dissolution in boiling 9:1 benzene-ethanol and dilution with small amounts of heptane with cooling. The solid was collected, washed with heptane and dried to afford 1.5 g. (24%) of product, M.P. 197–200° C.

*Analysis.*—Calcd. for $C_{17}H_{18}ClN_3O_4S_2$: S, 14.92; Cl, 8.23. Found: S, 14.92; Cl, 8.32.

Various changes and modifications of the invention can be made and, to the extent that such variations incorporate the spirit of this invention, they are intended to be included within the scope of the appended claims.

What is claimed is:
1. 2-(phenyl-lower alkyl)-6-halo-3,4-dihydro-3-(lower alkanone) - 7-sulfamyl - 1,2,4 - benzothiadiazine-1,1-dioxide.
2. 2-(phenyl-lower alkyl) - 6 - trifluoromethyl-3,4-dihydro - 3 - (lower alkanone)-7-sulfamyl-1,2,4-benzothiadiazine-1,1-dioxide.

References Cited by the Examiner
UNITED STATES PATENTS

| 3,001,994 | 9/1961 | Wiselogle et al. | 260—243 |
| 3,163,644 | 12/1964 | De Stevens et al. | 260—243 |

FOREIGN PATENTS

| 36,956 | 5/1959 | Luxembourg. |

NICHOLAS S. RIZZO, *Primary Examiner.*